United States Patent
Scaringe

(10) Patent No.: US 7,438,801 B2
(45) Date of Patent: Oct. 21, 2008

(54) COMPACT PERSONAL WATER PURIFICATION DEVICE

(75) Inventor: Robert Joseph Scaringe, Rockledge, FL (US)

(73) Assignee: Mainstream Engineering Corp., Rockledge, FL (US)

( * ) Notice: Subject to any disclaimer, the term of this patent is extended or adjusted under 35 U.S.C. 154(b) by 549 days.

(21) Appl. No.: 11/009,669

(22) Filed: Dec. 13, 2004

(65) Prior Publication Data

US 2006/0124517 A1 Jun. 15, 2006

(51) Int. Cl.
*B01D 61/10* (2006.01)
*B01D 63/10* (2006.01)
*C02F 1/44* (2006.01)

(52) U.S. Cl. .............. 210/137; 210/198.1; 210/416.3; 210/321.69; 210/321.83; 210/244; 222/189.11

(58) Field of Classification Search ............. 210/652, 210/198.1, 136, 416.1, 416.3, 192, 321.69, 210/321.6, 321.83, 321.74, 238, 244, 321.78, 210/321.87, 137; 417/374, 544, 552, 554; 222/189.11, 189.06

See application file for complete search history.

(56) References Cited

U.S. PATENT DOCUMENTS

| 629,387 | A | * | 7/1899 | Nordmeyer | ............... | 210/416.3 |
|---|---|---|---|---|---|---|
| 3,365,061 | A | | 1/1968 | Bray | | |
| 3,367,504 | A | | 2/1968 | Westmoreland | | |
| 4,070,280 | A | | 1/1978 | Bray | | |
| 4,187,173 | A | | 2/1980 | Keefer | | |
| 4,377,475 | A | * | 3/1983 | Wiedemann | ............... | 210/136 |
| 5,120,437 | A | * | 6/1992 | Williams | ............... | 210/244 |
| 5,531,887 | A | * | 7/1996 | Miers | ............... | 210/135 |
| 5,632,904 | A | | 5/1997 | Samad et al. | | |
| 6,303,039 | B1 | | 10/2001 | Back et al. | | |
| 6,632,357 | B1 | | 10/2003 | Barger et al. | | |
| 2003/0038074 | A1 | * | 2/2003 | Patil | ............... | 210/321.74 |

* cited by examiner

*Primary Examiner*—Terry K Cecil
(74) *Attorney, Agent, or Firm*—Crowell & Moring LLP

(57) ABSTRACT

A lightweight, portable, water purification device can be used to recover potable water from any water source. The manually operated device, requires no external power, is very lightweight, and removes salt and other impurities from source water while also disinfecting it. A symmetrical reverse osmosis (RO) membrane coupled with a pre-filter is used to remove salt and impurities from the raw water. Metal biocides are integratable to disinfect the permeate, improve wet storage and to significantly reduce biofouling within the RO membrane.

26 Claims, 4 Drawing Sheets

SECTION A—A

COMPACT PERSONAL WATER PURIFICATION DEVICE

BACKGROUND OF THE INVENTION

The present invention relates to a water purification device and, more particularly, to a low-cost device that is portable and avoids the need for using pressure recovery but instead using a straightforward flow path by way of back pressure regulation.

A typical reverse osmosis (RO) water purification system uses a high-pressure pump to provide high pressure raw water at a steady flow rate to the membrane element or elements. Almost all small to medium size reverse osmosis systems use spiral wound membrane elements. These cross-flow elements have one inlet stream and two outlet streams, more specifically, a feed fluid inlet opening, a retentate outlet and a permeate outlet. The permeate outlet is isolated from the retentate outlet and from the inlet. This type of spiral wound membrane is described in U.S. Pat. No. 3,367,504 which sets forth a method and apparatus for recovering purified water from sea water by applying the (RO) principle and employing a spirally wound modular membrane.

Although small, handheld RO devices that allow for implementation of spiral wound membranes are also known, they typically feature an elaborate system of plumbing to allow for pressure recovery which is the process of converting the pressure energy of the discharge brine stream into useful energy. These energy recovery devices are also effectively implemented in many large steady flow RO systems. However, in such small hand operated devices, pressure recovery mechanisms marginally increase the system efficiency and lead to overly complex devices such as that outlined in U.S. Pat. No. 4,187,173 which can not be implemented effectively in an actual device.

A significant effort has been spent on improving the performance of RO membranes and their configuration. U.S. Pat. No. 3,367,504 describes an RO separation apparatus employing an envelope of semi-permeable membrane sheets spaced apart by a layer of porous backing material and spirally wound with a continuous length of separator grid material about a hollow mandrel. An aqueous feed solution is introduced through the separator grid material, permeated water passes through the membranes and into the backing material by reverse osmosis and the backing material discharges the permeated water into the hollow porous mandrel.

U.S. Pat. No. 6,632,357 discloses another configuration for the RO membrane which includes a laminated composition having two sheets formed from a polymer and positioned adjacent one another to form a fluid passage there between. The outside surfaces of the sheets are permeable to allow fluid flow from the outside surface to the fluid passage. The outside surface and of the laminated composition includes a plurality of embossed islands spaced from one another to define feed pathways around and between the embossed islands.

U.S. Pat. No. 3,365,061 discusses a portable apparatus for producing desalinized water. A hand-operated reciprocating piston pump supplies saline water through a check valve into a line connected to a reverse osmosis purification device. A hydraulic accumulator is connected to the line through an initially closed valve which opens when pressure in the line is at a value above the osmotic pressure of the aqueous solution. A relief valve prevents rupture of the semi-permeable membranes and throttle valve in the discharge line facilitates maintenance of the desired operating pressure.

U.S. Pat. No. 4,070,280 describes an RO apparatus using a pump for pressurizing feed water introduced into a pressure resistant container in which is slidably mounted a semi-permeable membrane cartridge. This membrane cartridge contains an inner passage for the collection of purified water; the movement of the membrane cartridge inside the pressure resistant container provides "a very high degree of turbulence in the fluid flowing over the membrane stroke." This device contains an inlet for contaminated water, and outlet for concentrated contaminated water and a second outlet for purified water.

In the aforementioned known RO apparatus, the purified water flows from the center of the membrane, through the rod ("attached to an end of the semi-permeable membrane cartridge, and passes slidably and sealingly through one end of the pressure resistant container") and into a purified water container. This hollow rod is connected to means for reciprocal actuation as well as an outlet container for accumulating the purified water. The actuation of the membrane provides "improved turbulence and circulation of the feed water through the semi-permeable membrane cartridge over the membrane surfaces. The common means may be in the form of a lever operated by a handle or pedal, or by a power source such as an electric motor." This motion of the semi-permeable membrane is not to pressurize one end of the pressure resistant chamber so as to force purified water into the core of the membrane; the pressurization necessary to force water into the core of the membrane is performed by the external pump.

U.S. Pat. No. 4,187,173 discloses a device where water desalination is achieved by using a semi-permeable membrane which selectively permeate purified water from a feed solution pressurized by reciprocating piston or diaphragm pump. Pump action is assisted by returning pressurized concentrate fluid acting on the reverse side of the pump or diaphragm. Directional valves controlling alternating admission and venting of concentrate fluid to and from pump cylinder are actuated mechanically by reversal force applied to the piston rod.

In a conventional, steady flow RO system, high-pressure salt water is supplied to a commercial membrane, and a small fraction of this water passes through the membrane becoming potable desalinated drinking water, while the remaining water is discharged as brine. Similarly, in conventional individual RO water purifiers, as described in U.S. Pat. No. 4,187,173, a fixed flow is passed through the membrane with each stroke.

Current commercial configurations follow the design disclosed in U.S. Pat. No. 4,187,173 where a flow valve directs the discharge of the pump (generated on the front side of the piston) into the membrane. Additionally, the high pressure brine is brought to the backside of the piston in an attempt to recover its pressure energy. To discard this brine a flow valve directs the brine out of the device during the piston upstroke. This type of configuration, while being unduly complex and costly also requires significant pumping effort on both the upstroke and down stroke of the piston. A significant amount of effort is required when one considers that this pump must be actuated approximately 30 stokes per minute. In addition, proper implementation of the pressure recovery requires that the high pressure brine be removed from the outlet end of the membrane, thus allowing it to properly operate as a cross flow device. This cannot be effectively implemented, however, in a device with a removable pressure vessel that allows membrane replacement.

Current commercial devices which are based on U.S. Pat. No. 4,187,173 short circuit the cross-flow membrane by taking high pressure water from the inlet side of the membrane which is detrimental to membrane performance and life. The intermittent configuration disclosed here is a radical departure from the configuration disclosed in U.S. Pat. No. 4,187, 173 and used by commercial individual water purifiers. While energy recovery is beneficial for large continuously flowing systems, it provides no practical value in this individual water purification application.

SUMMARY OF THE INVENTION

The present invention provides a new and improved apparatus which integrates a spiral wound element into a handheld RO purification device in a low cost and simple construction. The present invention does so by avoiding the use of pressure recovery and instead using a straightforward flow path. Additionally, the spiral wrapped membrane has been enhanced by placing conventional coarse filters on each end of the membrane. The upstream filter serves as a pre-filter for the RO membrane, while the downstream filter is back-washed by the exiting concentrated brine. When the operating pressure increases too much or water production diminishes the entire membrane assembly is simply flipped over, allowing the original pre-filter to be back-washed by the concentrated brine. Metal biocides as taught in U.S. Pat. Nos. 5,632,904 and 6,303,039B1 are also able to be integrated into the present invention to disinfect the permeated and raw water contained in the device during prolonged storage.

In the present invention, rather than a steady flow of high pressure, raw water flowing through the cross-flow membrane, the system is configured with essentially an intermittent flow of high pressure raw water. The raw water is pressurized by a small diameter positive displacement piston; the use of a small diameter piston keeps the forces generated on it relatively small (Force =Pressure*Area). Furthermore, an optional vapor space can be included in the design of the pressure vessel. This vapor space serves as a low-cost vapor spring whose purpose is to accommodate differences between the volumetric flow of water compressed and the flow of water purified by the membrane, thus serving as a differential surge protector. In the currently preferred embodiment, the vapor space is not implemented and the pressure varies from 900 psig maximum to 600-psig minimum during sea water operation.

The present invention also uses a different principle of operation to remove brine from the device. Rather than force a predetermined flow of brine through the system with each stroke, as is described in U.S. Pat. No. 4,187,173, the configuration uses a back pressure regulation device. Besides being simpler, the configuration does not require any significant force on the up-stroke to force the brine from the device thus the force on the pump lever is uni-directional. That is the operator only need push the lever down, the upward piston motion being quite easy.

Another improvement to the conventional design has been the use of a symmetrical membrane assembly with course filters placed at each end. The filter located at the inlet end serves to filter the water prior to desalination and the downstream filter is back-washed by the exiting concentrated brine solution. When the operating pressure increases too much or water production diminishes, the entire membrane assembly is simply flipped over, (reoriented 180 degrees from the original configuration) so that the original pre-filter is now being backwashed.

Water can be disinfected in various ways. Current technologies utilize chlorine, bromine, ammonia, ozone, ultraviolet light, or hydrogen peroxide to treat non-potable water supplies. Application of these disinfection technologies can, however, yield toxic by-products, or require bulky systems or external power supplies which are not easily integrated into a man portable system where weight and size are critical.

A greatly improved disinfection method is the use of metal biocides as taught in the aforementioned U.S. Pat. Nos. 5,632, 904 and 6,303,039B1. Certain metals such as silver (Ag), nickel (Ni), zinc (Zn), copper (Cu), and tin (Sn) can be added to water in very small concentrations to kill microbes (e.g., bacteria, fungi, algae, and virus). For example, Ag is effective against virus and bacteria. In particular, a concentration of about 0.02 ppm (or 20 ppb) in water is effective against Legionella pneumophilia. Cu is also an effective algaecide and in some cases a bactericide. Other metals can also be effective against different microbes to differing degrees.

The biocide metals and chelating agents slowly dissolve creating chelated metal biocides which are metabolized by microbes and disinfect the water. The concentrations of the metal biocides in the purified water are well below EPA drinking water standards. Current EPA National Primary Drinking water Standard MCL's (Maximum Containment Levels) for copper and nickel are 1.3 ppm and 100 ppb, respectively. The current EPA National Secondary Drinking Water Standard SMCL (Suggested Maximum Containment Level) for copper, silver, and zinc are 1 ppm, 100 ppb, and 5 ppm respectively. At these low concentrations, there is little or no taste imparted to the drinking water.

In the device according to the present invention the biocide is located inside the low-pressure permeate tube to disinfect the drinking water produced. Referred to as the low-pressure Permeate Tube Biocide (PTB), this biocide is formulated to dissolve and enter the water stream as the permeate stream flows over the biocide. In this configuration, the biocide/ chelating agents are designed to dissolve slowly to produce residual metal biocide content during the entire water-production life of the membrane.

A second biocide is located in the coarse filters, that is in the high pressure raw water (brine-side of the membrane) and referred to as the high pressure Raw Water Biocide (RWB). Here it is preferable to use a slowly dissolving biocide of the type taught in the aforementioned U.S. Pat. Nos. 5,632,904 and 6,303,039B1. The purpose of the RWB is to slowly dissolve, so that when the device is inactive for any extended period of time the treatment metals will dissolve and act as a preservative to prevent bio-fouling from destroying the membrane during storage.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
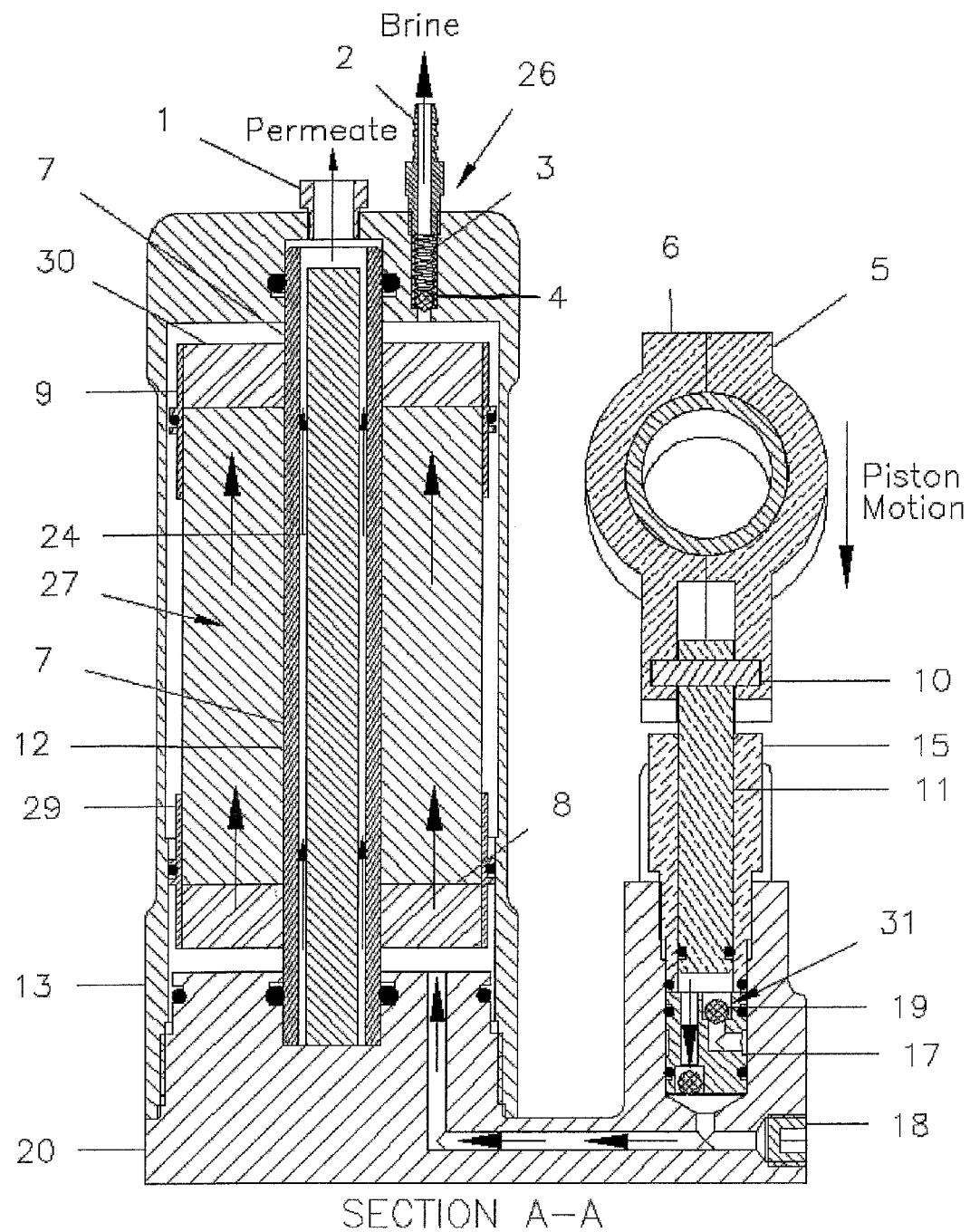
FIG. 1 is a front cross-sectional view of the compact water purification device of the present invention along line A-A of FIG. 2 showing the flow paths and sealing ball locations for a pressure generating down-stroke.
Figure 2:
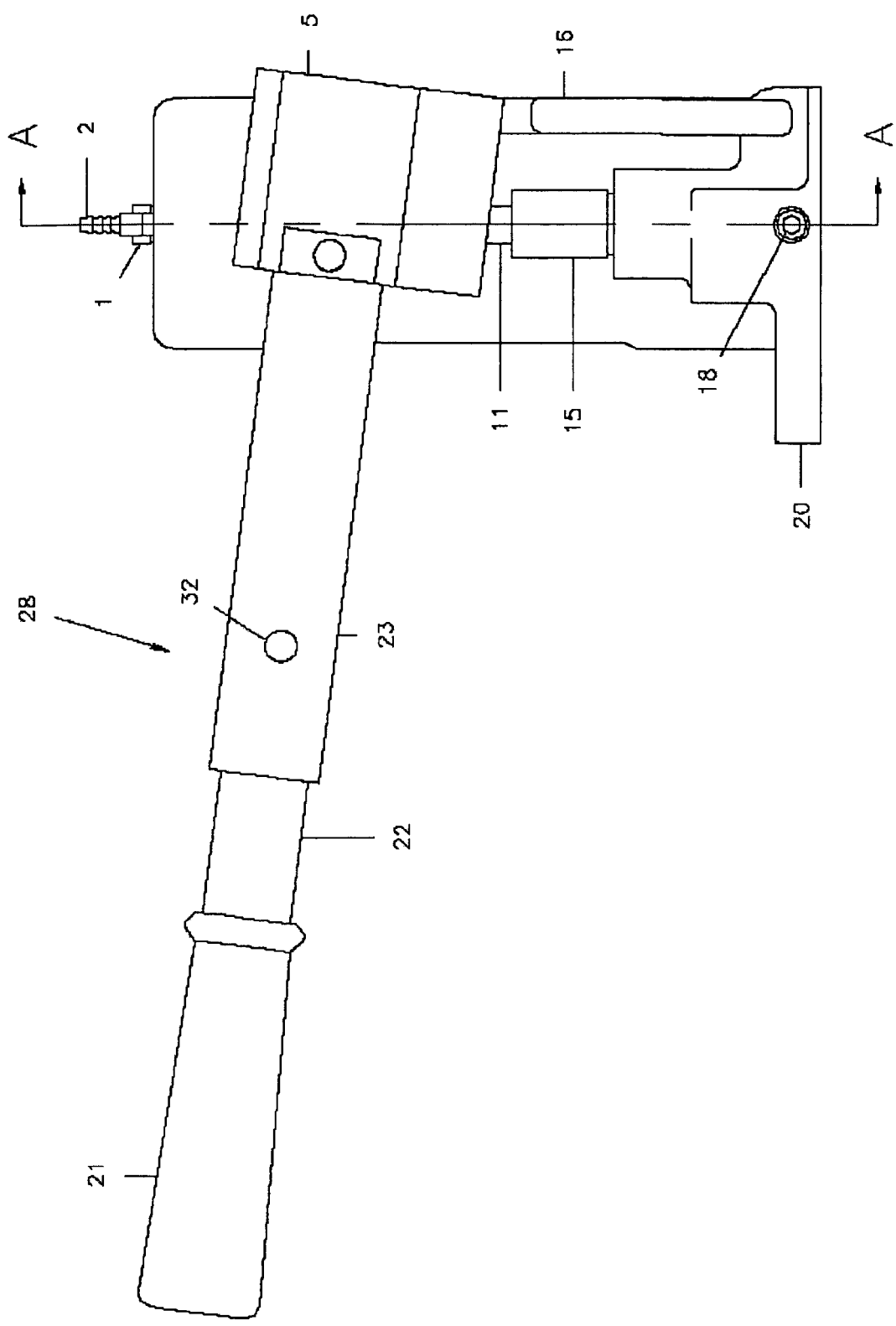
FIG. 2 is the side view of the device shown in FIG. 1.

Referring now in particular, to FIG. 1, the device compromises a removable pressure vessel 13 which houses the membrane assembly designated by numeral 27. The removable pressure vessel threads on to the base 20, and its removal allows easy replacement of the membrane assembly 27. The membrane assembly 27 consists of a perforated permeate tube 7 upon which an RO membrane 12 of generally known construction is wound. The perforated permeate tube also houses 7 a permeate tube biocide (PTB) 24 which disinfects the permeate. An upstream coarse filter 8 and an identical downstream coarse filter 30 are also attached to the permeate tube 7 and sandwich the wound RO membrane. The upstream coarse filter 8 removes particles that are greater than about 20 microns in size, and thus help prevent fouling of the RO membrane. A RWB, as previously described, is also located, i.e. dispersed in these coarse filters 8, 30, so that when the device is inactive for any extended period of time the treatment metals will dissolve and act as a preservative to prevent bio-fouling from destroying the membrane.

An upstream O-ring retainer 29 and an identical downstream O-ring retainer 9 and their corresponding O-rings are attached to each end of the membrane assembly 27 thus maintaining its symmetrical configuration which permits it to be flipped 180°. The ability to flip the membrane assembly 27 180° allows the initial upstream coarse filter 8 to be reoriented downstream to permit back-flushing with the discharge flow. The back-flushing of the downstream coarse filter 30 when so flipped removes or releases much of the particles captured during its operation in the upstream location. The inside diameter of the pressure vessel 13 is stepped to a larger inside diameter sufficient to allow the membrane assembly 27 to be installed or flipped very easily; only the O-ring of the upstream O-ring retainer 29 is needed to perform the sealing function.

A piston 11 is attached to a right and left handle mounts 5, 6, respectively, with piston pivot pin 10. The right and left handle mounts 5, 6 separate to allow the piston pivot pin 10 to be captured. The piston 11 creates pressure during its down stroke within a cylinder 15 which is threaded into a base 20 associated with the pressure vessel 13. The direction of raw water flow is controlled with a valve assembly 31, in which a valve housing 17 contains two identical sealing balls 19 which reorient themselves depending on the hydrodynamic pressure. During the piston 11 down stroke shown by the arrow in FIG. 1, the sealing balls 19 within the valve housing 17 reorient to allow the raw water fed into the cylinder 15 via an inlet (FIG. 3) in the form of a raw water inlet quick disconnect 25 to be forced through a high-pressure flow channel within the base 20 and into the pressure vessel 13 as indicated by the four large arrows which represent the flow of raw water. An NPT(National Pipe Thread) plug 18 can be used to plug the hole created in machining the high pressure flow channel within the base 20. The high pressure raw water then flows through the membrane assembly 27 thus allowing the cross-flow membrane 12 to operate properly; once the pressure of the raw water within pressure vessel 13 exceeds its osmotic pressure, flow through the cross-flow RO membrane 12 begins. Permeate flow is indicated by the four smaller arrows.

A back pressure regulation device 26 allows the pressure to build within the pressure vessel 13 to a desired value before a concentrated brine solution is exhausted through a discharge outlet 2. The pressure at which the back pressure regulation device 26 permits brine flow depends on the compression setting of a compression spring 3. The compression spring 3 exerts a force on the pressure regulation sealing ball 4 thus sealing the brine exhaust at low pressures. The piston 11 stroke length is calibrated or sized such that, during each down stroke, the pressure reaches the amount necessary to exhaust the brine solution. This rapid exhausting of brine through the back pressure regulation device 26 helps prevent concentration polarization. Upon operation, potable water fills the perforated permeate tube 7 and contacts the permeate tube biocide (PTB) 24 located within the permeate tube 7 before exiting through the potable outlet quick disconnect 1 as indicated by the smaller PERMEATE flow arrow.

Figure 4:
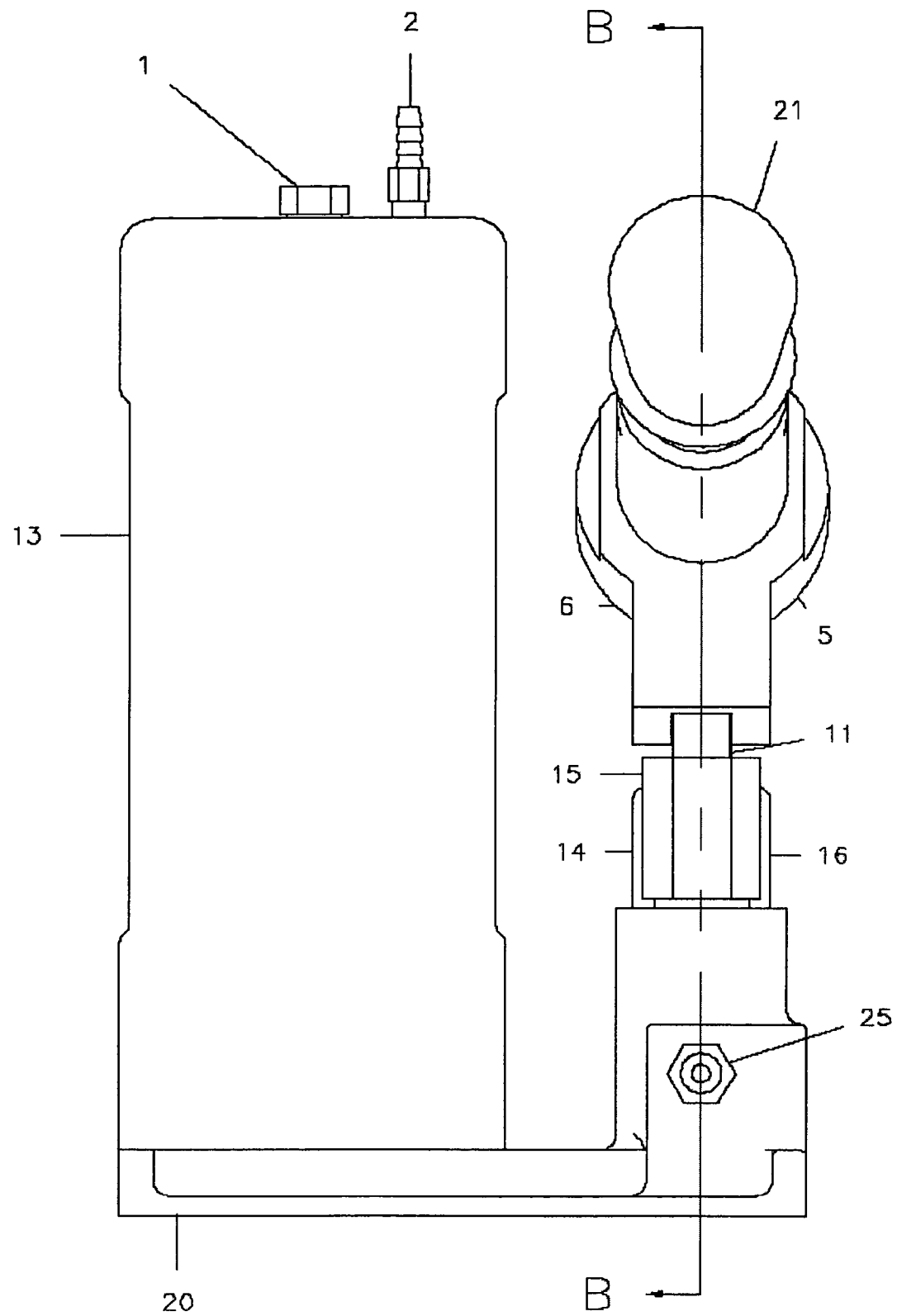
FIG. 4 is a front view of the device shown in FIGS. 1-3.

A right anchor mount 16 and an adjoining left anchor mount 14, shown in FIG. 4, in which a raw water disconnect 25 is also shown, serve as the fulcrum support for the lever arm assembly 28. The lever arm assembly 28 includes a large diameter lever arm 23, a small diameter lever arm 22, and an ergonomic rubber grip 21. The large diameter lever arm 23 slides into the joined right and left lever mounts 5, 6 respectively, and is retained therein with a snap button 32. The small diameter lever arm 22 slides into the large diameter lever arm and is also held with a snap button 32 in a generally known way. The lever arm assembly 28 gives the user the required mechanical advantage needed to pump the device. The use of a snap button allows the lever arm assembly 28 to be easily removed and disassembled for compact storage of the device.

The piston pivot pin 10 and fulcrum pivot pin 34 are captured by the joining of the left and right lever mounts, 5, 6 respectively. Similarly, an anchor pivot pin 33 is captured by the joining of the left and right lever anchors, 14, 16. The lever mounts 5, 6 also provide a mount for the large diameter lever arm section 23 of the lever arm assembly 28.

Figure 3:
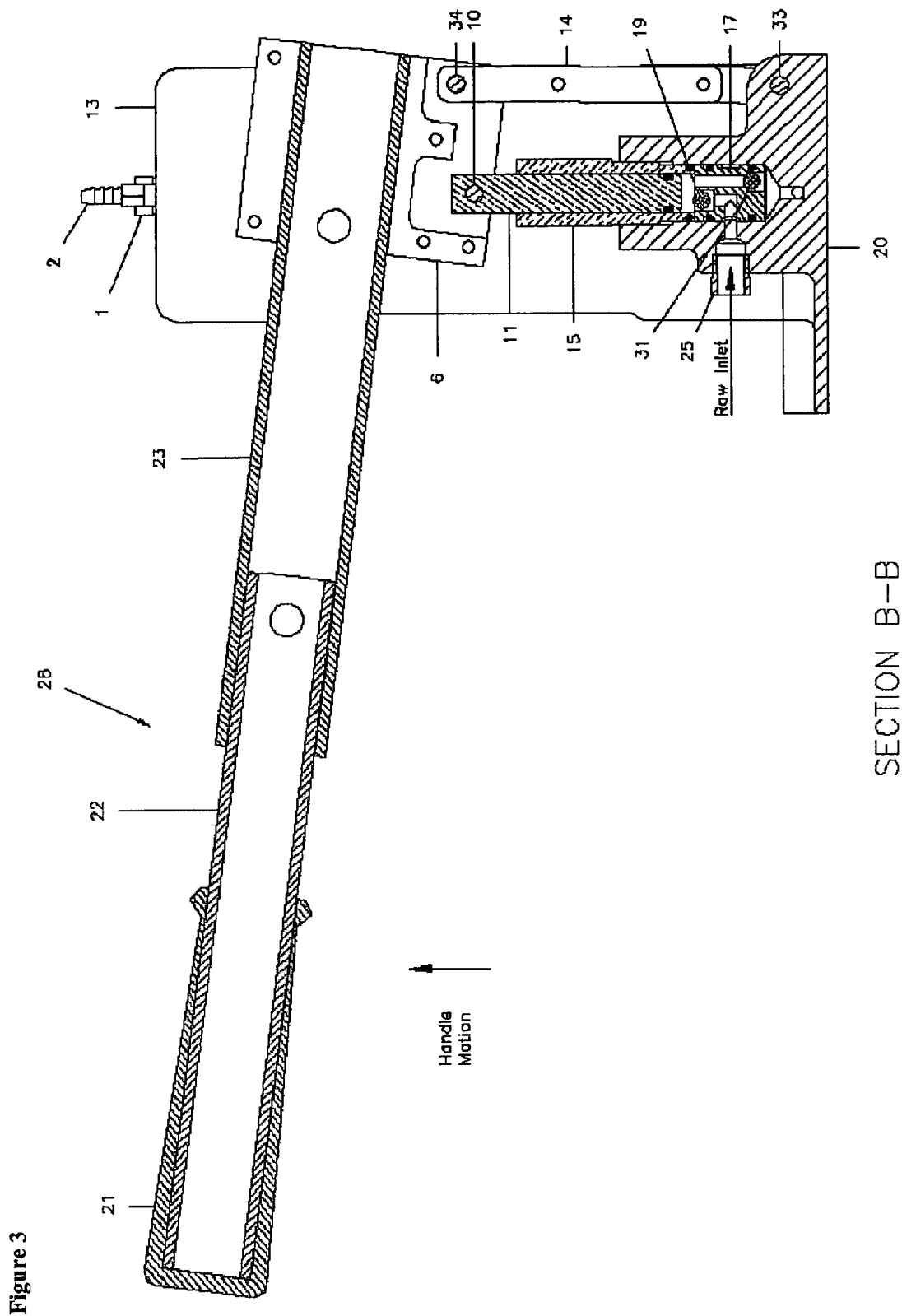
FIG. 3 is a right side cross-sectional view along line B-B of FIG. 4 showing the flow paths and sealing ball locations for a raw water intake up-stroke.

During the up-stroke of the piston 11, the sealing balls 19 within the valve housing 17 reorient themselves to allow raw water to be drawn from a raw water source through an inlet hose attached to the inlet quick disconnect 25, through the valve assembly 31 and into the cylinder 15. The sealing balls 19 also prevent pressurized water within the pressure vessel 13 from escaping. The valve assembly 31 in FIG. 3 is rotated 90° from that shown in FIG. 1 to more fully show the sealing balls 19 and flow channels within the valve housing 17. At the location of the raw inlet, the diameter of the valve housing 17 is stepped to allow the inlet flow of raw water through the valve housing 17 regardless of its rotation about its vertical axis.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A portable water purification device, comprising
a pressure vessel removably mounted atop a base and containing a reversible reverse osmosis membrane assembly configured to provide a straightforward flow path and to which an intermittent flow of high pressure raw water is supplied, said membrane assembly including a semi-permeable membrane surrounding a permeate tube;
a handle mechanism coupled to said base and configured for manually pressurizing raw water to be treated; and
a biocide positioned within said permeate tube and configured to release metal biocide to treat said permeate.

2. The device according to claim 1, wherein a back pressure regulation device is operatively associated downstream of the membrane assembly to maintain water pressure within the pressure vessel at a predetermined level.

3. The device according to claim 2, wherein the back pressure regulation device comprises an adjustable compression spring configured to be set to the predetermined level which determines when a concentrated brine solution is discharged from the device.

4. The device according to claim 1, wherein the pressure vessel is removable to allow access to and reversal of the membrane assembly.

5. The device according to claim 4, wherein the removable pressure vessel is configured to permit easy reversal of the membrane assembly.

6. The device according to claim 5, wherein a back pressure regulation device is operatively associated downstream of the membrane assembly to maintain water pressure within the pressure vessel at a predetermined level.

7. The device according to claim 6, wherein the concentrated brine solution is exhausted through the back pressure regulation mechanism.

8. The device according to claim 1, wherein the pressure vessel and handle mechanism are sized to provide a portable unit.

9. The device according to claim 1, wherein the pressure vessel and handle mechanism are associated with a common base through which raw water to be treated is supplied.

10. The device according to claim 9, wherein the handle mechanism includes a handle which is pivotally supported in relation to the common base and is operatively connected to a reciprocatable piston whose stroke is calibrated to permit concentrated brine solution to be exhausted from the device during a movement of the handle in a first direction.

11. The device according to claim 10, wherein the handle is a multi-part unit configured to be at least one of removed and disassembled for compact storage.

12. The device according to claim 10, wherein the piston is movable within the common base and operatively cooperates with a sealing ball arrangement in a valve housing arranged at the common base whereby raw water is admittable into the common base during a movement of the handle in a second direction.

13. The device according to claim 12, wherein the sealing ball arrangement comprises multiple sealing balls arranged to reorient themselves in response to raw water being admitted into the device and to prevent pressurized water already within the device from being exhausted.

14. The device according to claim 1, wherein the membrane assembly is comprised of said perforated permeate tube upon which a reverse osmosis membrane is wound.

15. The device according to claim 14, wherein a coarse filter is operatively arranged at each of an upstream end and a downstream end of the perforated permeate tube.

16. The device according to claim 15, wherein the biocide is operatively associated with a high-pressure side of the membrane assembly.

17. The device according to claim 16, wherein the permeate tube biocide comprises at least one of a biocide metal and a chelating agent in concentrations sufficient to destroy virus and bacteria contained in raw water trapped in the device during extended storage periods.

18. The device according to claim 15, wherein biocide is located in at least one of the coarse filters.

19. The device according to claim 18, wherein the permeate tube biocide is formulated to develop biocide metal and a chelating agent concentrations sufficient to destroy virus and bacteria raw water contained in the device during extended storage periods of at least a day.

20. The device according to claim 15, wherein each coarse filter at the upstream end is sized to filter particles having a size greater than about 20 microns.

21. The device according to claim 1, wherein the permeate tube biocide is formulated to develop biocide metal and a chelating agent concentrations sufficient to destroy virus and bacteria raw water contained in the device during extended storage periods of at least a day.

22. The device according to claim 1, wherein the permeate tube biocide comprises at least one of a biocide metal and a chelating agent in concentrations sufficient to destroy virus and bacteria contained in the purified permeate water.

23. The device according to claim 22, wherein the membrane assembly is comprised of said perforated permeate tube upon which a reverse osmosis membrane is wound.

24. The device according to claim 23, wherein a coarse filter is operatively arranged at an upstream end and a downstream end of the perforated permeate tube, and the coarse filters are sized to filter particles having a size greater than about 20 microns.

25. The device according to claim 24, wherein a coarse filter contains a slowly dissolving formulated biocide to preserve the membrane during periods of inactivity.

26. The device according to claim 24, wherein a back pressure regulation device is operatively associated upstream of the membrane assembly to maintain water pressure within the pressure vessel at a predetermined level.

* * * * *